SWITCH TYPE TELEVISION TUNER WITH STAMPED TUNING ELEMENT MOUNTED ON STATIONARY CONTACTS

Filed Dec. 22, 1958

INVENTOR.
John R. Gelzer
BY. Robert L. Kahn
Atty.

2,954,469
Patented Sept. 27, 1960

2,954,469

SWITCH TYPE TELEVISION TUNER WITH STAMPED TUNING ELEMENT MOUNTED ON STATIONARY CONTACTS

John R. Gelzer, Barrington, Ill., assignor to Oak Manufacturing Co., a corporation of Delaware Filed Dec. 22, 1958, Ser. No. 782,298

4 Claims. (Cl. 250—40)

This invention relates to a television tuner of the switch type and is particularly useful for VHF television channels 2 to 13 inclusive as presently used in the United States.

The VFH television band comprises channels 2 to 6 inclusive and channels 7 to 13 inclusive, these two groups of channels being separated by a substantial range of frequencies. Each channel is substantially six megacycles wide. With increase in frequency, the amount of change in inductance or capacitance for going to an adjacent channel decreases. Since a tuner embodying the present invention uses inductance variation for tuning, it will be clear that a smaller change in inductance is required for going to an adjacent channel as channel 13, the high frequency end of the band, is approached.

Because of the above, it is possible to utilize minute inductances for television tuning particularly for the high frequency channels 7 to 13. It has been the practice to provide switch type tuners wherein a rotary switch having at least 12 positions selects the desired inductances for channel tuning. Such constructions have generally utilized small wire coils or windings. For channels 2 to 6, the low frequency part of the television band, prefabricated coils are practical and do not require excessive amount of adjustment to insure accurate operation. However, at the high frequency end of the band, from channel 7 to 13 inclusive, the sensitivity of the circuits to slight changes in inductance has made it difficult to utilize prefabricated wire windings.

This invention provides a simple and economical construction for a switch type TV tuner wherein prefabricated inductance elements for the high frequency channels are possible. The construction embodying the present invention makes it possible to achieve considerable accuracy and flexibility with regard to the electrical characteristics without imposing unreasonable demands on mechanical accuarcy. The new construction further has the advantage of being readily added to a conventional rotary switch construciton.

In order that the invention may be understood, it will now be explained in connection with the drawings wherein an exemplary embodiment is illustrated.

Referring to the drawings.

Figure 1:
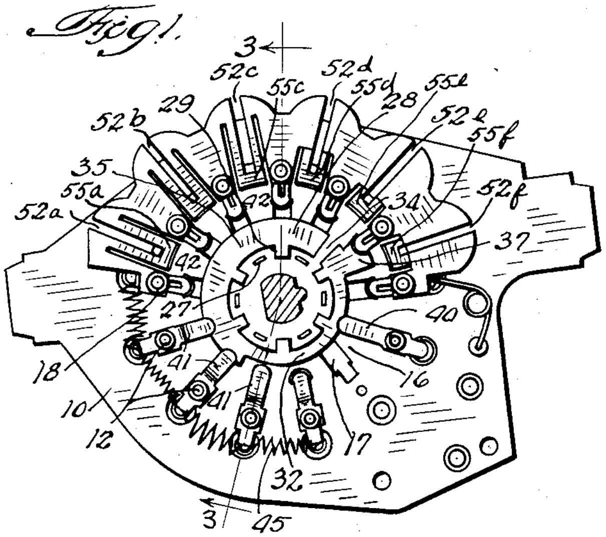
Figure 1 is a top view of one section of a switch type tuner for television channels 2 to 13 inclusive.
Figure 3:
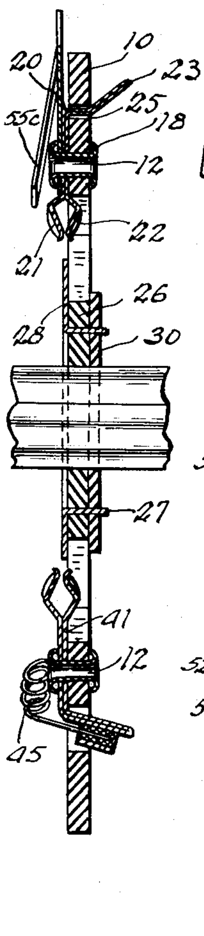
Figure 3 is a section on broken line 3—3 of Figure 1.
Figure 2:
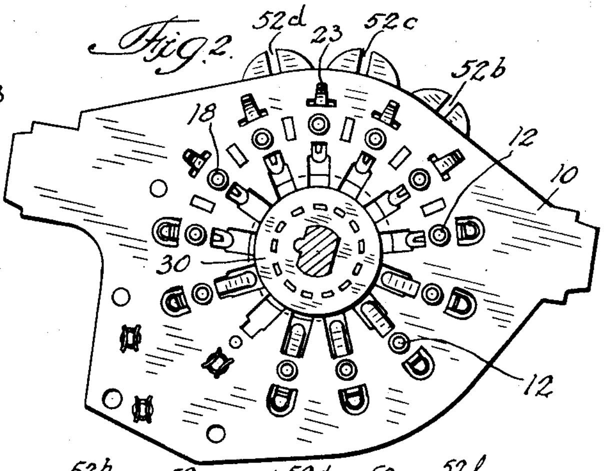
Figure 2 is a bottom view of the switch section.
Figure 4:
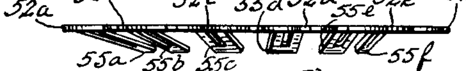
Figures 4 and 5 are side and plan views respectively of the inductance element for high frequency channels.
Figure 5:
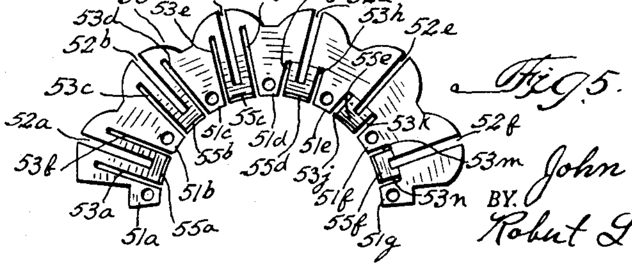

The new type switch tuner is preferably provided by modifying a rotary switch construction disclosed and claimed in United States Patent No. 2,186,949 issued on January 16, 1940. The rotary switch proper comprises stator 10 of suitable, rigid insulating material preferably having stable resistance values in spite of atmospheric changes. A suitable insulating material for this purpose is a good quality of "Bakelite," this usually consisting of layers of fabric impregnated with resin. It is also possible to use other materials such as ceramic or glass. Stator 10 has a series of apertures 12 disposed in a circular pattern and has a central region cut out therefrom for accommodating a rotor to be described.

Stator 10 has a number of tongues 16 inwardly extending toward the cut out region, these tongues 16 being formed by cutouts 17 in the stator material. Cutouts 17 are radially aligned with apertures 12. Apertures 12 accommodate eyelets 18 for securely anchoring stator contacts 20, each having jaws 21 and 22 and terminal portion 23. One of the jaws is adapted to lie in corresponding space 17 so that the jaws may open and close freely. Terminal portions 23 pass through apertures 25 in the stator.

The rotor comprises insulating disc 26 having a plurality of rotor contact mounting slots 27. Rotor disc 26 carries rotor contact 28, this being in the form of a flat annular member. Rotor contact 28 has inwardly extending tongues 29 which are adapted to pass through rotor disc slots 27 and are staked to the rotors. Disc 26 is within the stator cutout region and is maintained in position by contact 28 and auxiliary disc 30. Contact 28 and auxiliary disc 30 overlie the stator and lock the rotor in position. The construction so far described generally is similar to that disclosed in the patent previously identified.

Rotor contact 26 has three stepped portions. Innermost portion 32 extends completely around the rotor contact except for slot 34 which breaks the circular continuity of the contact. Intermediate contact step 35 is next and for a 12-position switch will have an angular extent of seven switch positions. The third step is outermost portion 37 subtending one switch position.

Stator contacts 20 are of different sizes and consist of one grounding contact 40, four low frequency channel contacts 41 and seven high frequency contacts 42. Grounding contact 40 is the longest and extends furtherest to engage rotor contact portion 32. The low frequency contacts are shorter and cooperate with intermediate step 35 or outer step 37 of the rotor contact. The high frequency contacts are the shortest and only cooperate with outermost step 37 of the rotor contact.

Between stator contacts forming the low frequency channels there may be connected coils 45 of wire forming suitable inductances. This construction is conventional. Connecting the various high frequency stator contacts is the new structure embodying the present invention. This comprises sheet metal stamping 50 having an outline conforming to the shape of the switch and subtending seven switch positions. Stamping 50 is slotted to provide a number of generally M-shaped portions extending between body portions **51*a* and 51*g* inclusive. The inner ends of body portions 51*a* to 51*g* inclusive are apertured and are rigidly attached to the stator contact by eyelets 18. Slots 52*a* to 52*f* inclusive, extend inwardly from the outer edge of stamping 50 for a predetermined uniform depth. Slots 53*a* to 53*n* inclusive extend outwardly from the inner edge of stamping 50 and these slots are disposed symmetrically on opposite sides of each of the 52 series of slots. Thus inwardly extending tongues 55*a* to 55*f* inclusive are provided. Tongues 55*a* to 55*f* are adapted to be bent upwardly out of the plane of the M portions. The length of the 53 series of slots plus the depth of the 52 slots plus the amount of bending of tongues 55** will all contribute toward controlling the inductance of the stamping at each switch position.

Slot 34 in the rotor contact also contributes to provide inductance due to the curvature of the rotor contact. It will be noted that slot 34 is adjacent part 37 of the rotor contact which is widest due to the presence of the outer and intermediate contact portions. It has been found that disposing slot 34 on one side or the other side of rotor contact portion 37 functions to provide for the progressive addition to or subtraction from the stator inductances of the rotor contact inductance as the rotor is turned.

The rotor may be actuated by a suitable shaft in conjunction with an index mechanism. If desired, a number of tuner sections may be mounted in a common frame or chassis to increase the effectiveness of channel selection.

If desired, rotor slot 34 may be disposed in other parts of the rotor contact or may be omitted.

While various kinds of stator contacts may be used, it has been found that the stator contacts disclosed here providing a pair of jaws disposed on opposite sides of each rotor contact imparts some inductance to the circuit and to that extent reduces the amount of inductance to be provided between the stator contacts, particularly at the high band.

It is also possible to omit some or all of the outer slots, these being the 52 series of slots and compensate for this by changing the dimensions of the corresponding inner slots in the 53 series. Thus specifically, outer slot 52*f* might be omitted and inner slots 53*m* and 53*n* could be changed in length to compensate.

What is claimed is:

1. A tuner of the switch type for use in the VHF television channel range, said tuner comprising two insulating supports, one of said supports being movable relatively to the other, movable contacts carried by said one support, stationary contacts carried by the other support for cooperation with said movable contacts, and a sheet metal stamping extending along a number of adjacent stationary contacts and connected thereto to form metallic electrical connections therebetween, said stamping providing a plurality of generally M-shaped portions, there being one M-shaped portion between adjacent stationary contacts, said stamping having an inner edge nearest the line of travel of the movable contacts and having an outer edge further from the line of travel of the movable contacts, said stamping being shaped to provide a relatively massive body portion having an inner mounting portion rigidly attached to and electrically connected to the corresponding stationary contact, said massive body portion extending outwardly from said inner mounting portion and joining adjacent M-shaped portions, each M-shaped portion having one outer slot extending from the outer edge of the stamping toward the line of travel of said movable contacts, said outer slots being symmetrically disposed between adjacent mounting portions, each M-shaped portion having a pair of additional slots extending from the inner edge, each such additional slot being disposed between the outer slot and a mounting portion so that each outer slot has an inner slot disposed on opposite sides thereof to leave a generally U-shaped part between the additional slots of an M-shaped portion, said part being bendable away from the plane of the sheet metal stamping whereby said sheet metal stamping provides a tortuous metallic path along the various slots between adjacent mounting portions to provide desired circuit characteristics for tuning, the characteristics being controlled by the dimensions of said various slots and by the amount of bending.

2. The construction according to claim 1 wherein said one insulating support comprises an insulating disc rotatable about its center, the other insulating support having a cutout within which said disc is disposed, said two supports lying in generally parallel planes, said stationary and movable contacts being disposed around the center of said disc, said stamping having curved inner and outer edges to engage a number of adjacent stationary contacts disposed generally in a curved path around the center of said disc.

3. A tuner of the switch type for use in the VHF television channel range, said tuner comprising an insulating disc structure, a stator insulating construction having a cutout portion within which said disc structure may rotate about a center, a generally annular flat metallic rotor contact carried by said disc structure, a plurality of stationary contacts carried by said stator for cooperation with said annular contact, there being twelve such stator contacts, five of said stator contacts forming one group and seven of said stator contacts forming another group, the contacts in each group being adjacent, said one group corresponding to channels 2 to 6 inclusive, said other group corresponding to channels 7 to 13 inclusive, inductors connected to the stator contacts of said first group for effecting tuning, and a metal stamping rigidly attached to and forming a continuous metallic connection between the stator contacts of said second group, said stamping providing a plurality of generally M-shaped portions, there being one M-shaped portion between adjacent stationary contacts, said stamping having an inner edge nearest the rotor contacts and having an outer edge away from the rotor contacts, said stamping being shaped to provide a relatively massive body portion having an inner mounting portion rigidly attached to and electrically connected to the corresponding stationary contact, said massive body portion extending outwardly from said inner mounting portion and joining adjacent M-shaped portions, each M-shaped portion having one outer slot extending from the outer edge of the stamping toward the rotor contact, said outer slot being symmetrically disposed between adjacent mounting portions, each M-shaped portion having a pair of additional slots extending outwardly from the inner edge, each such additional slot being disposed between the outer slot and a mounting portion so that each outer slot has an inner slot disposed on opposite sides thereof to leave a generally U-shaped part between the additional slots of an M-shaped portion, said part being bendable away from the plane of the stamping whereby said sheet metal stamping provides a tortuous metallic path along the various slots between adjacent mounting portions to provide tuning for channels 7 to 13 inclusive, such tuning being controlled by the slot dimensions and the amount of bending.

4. The construction according to claim 3 wherein said annular rotor contact is provided with a slot to break up the circular continuity thereof.

References Cited in the file of this patent

UNITED STATES PATENTS

| | | |
|---|---|---|
| 2,186,949 | Allison | Jan. 16, 1940 |
| 2,551,228 | Achenbach | May 1, 1951 |
| 2,789,212 | Achenbach et al. | Apr. 16, 1957 |
| 2,864,946 | Achenbach | Dec. 16, 1958 |